(12) United States Patent
Katayama et al.

(10) Patent No.: US 11,975,796 B2
(45) Date of Patent: May 7, 2024

(54) DRIVING SUPPORT SYSTEM FOR MOTORCYCLES

(71) Applicant: HONDA MOTOR CO., LTD., Tokyo (JP)

(72) Inventors: Makoto Katayama, Saitama (JP); Hiroki Tanaka, Saitama (JP); Hiroshi Maeda, Tokyo (JP)

(73) Assignee: HONDA MOTOR CO., LTD., Tokyo (JP)

( * ) Notice: Subject to any disclaimer, the term of this patent is extended or adjusted under 35 U.S.C. 154(b) by 303 days.

(21) Appl. No.: 17/678,028

(22) Filed: Feb. 23, 2022

(65) Prior Publication Data

US 2022/0315161 A1  Oct. 6, 2022

(30) Foreign Application Priority Data

Mar. 31, 2021 (JP) ................................. 2021-061283

(51) Int. Cl.
*B62L 3/00* (2006.01)
*B62J 45/20* (2020.01)
*B62J 45/40* (2020.01)

(52) U.S. Cl.
CPC ................. *B62L 3/00* (2013.01); *B62J 45/20* (2020.02); *B62J 45/40* (2020.02)

(58) Field of Classification Search
CPC .... B62L 3/00; B62J 45/20; B62J 45/40; B62J 45/41; B62J 45/00; B62J 50/21; B62J 27/00; B60T 2201/16; B60T 2201/022; B60T 8/1706; B60T 8/17558; B60T 8/3225; B60T 2210/32; B60T 7/22; B60W 2050/146; B60W 2050/143; B60W 2300/36; B60W 30/09; B60W 50/14; B60W 40/02; B62K 21/00

USPC .......................................................... 701/70
See application file for complete search history.

(56) References Cited

U.S. PATENT DOCUMENTS

| 2008/0192984 A1 | 8/2008 | Higuchi et al. |
| 2020/0017086 A1 | 1/2020 | Oshida |
| 2020/0339144 A1 | 10/2020 | Oshida |

FOREIGN PATENT DOCUMENTS

| JP | 2001114081 | * | 4/2001 | ......... B60T 8/17558 |
| JP | 2004203387 A | | 7/2004 | |
| JP | 2008197863 A | | 8/2008 | |

(Continued)

*Primary Examiner* — Hai H Huynh
(74) *Attorney, Agent, or Firm* — CKC & Partners Co., LLC

(57) ABSTRACT

A driving support system (1) for motorcycles including: an external sensor unit (2) which recognizes a road state ahead of one's own vehicle; a collision risk determination unit (62) which determines a level of collision risk between one's own vehicle and an object ahead of one's own vehicle based on a recognition result of the external sensor unit 2; an automatic braking control unit (61) which executes automatic braking to automatically operate a brake device (83) in response to the determination result by the collision risk determination unit (62); and a departure risk determination unit (64) which determines a level of departure risk of one's own vehicle to outside of one's own vehicle travel lane in a case of executing the automatic braking. The automatic braking control unit (61) ends execution of the automatic braking in a case of being determined that the departure risk is high.

8 Claims, 3 Drawing Sheets

(56) References Cited

FOREIGN PATENT DOCUMENTS

| | | |
|---|---|---|
| JP | 2018134990 A | 8/2018 |
| JP | 2021002328 A | 1/2021 |

\* cited by examiner

DRIVING SUPPORT SYSTEM FOR MOTORCYCLES

This application is based on and claims the benefit of priority from Japanese Patent Application No. 2021-061283, filed on 31 Mar. 2021, the content of which is incorporated herein by reference.

BACKGROUND OF THE INVENTION

Field of the Invention

The present invention relates to a driving support system for motorcycles. In more detail, it relates to a driving support system for motorcycles which executes automatic braking in response to the level of collision risk between one's own vehicle and an object ahead of one's own vehicle.

Related Art

A collision damage reduction brake device (hereinafter also referred to as "AEB device") is built into many four-wheel passenger cars. AEB device refers to a device which operates a braking operation automatically in order for one's own vehicle to avoid collision with an obstacle ahead of one's own vehicle, or decrease the collision speed.

In motorcycles, since it is possible to decrease collision damage by decreasing the collision speed by the AEB device, in recent years, research has progressed for equipping an AEB device to motorcycles. However, with a motorcycle, there is concern over triggering a fall due to the posture when activating of automatic braking. In particular, the possibility of falling rises when automatic braking activates while turning.

Patent Document 1 shows technology which changes the braking force by automatic braking according to the bank angle of the motorcycle. With the motorcycle shown in Patent Document 1, the risk of falling by the above such automatic braking is reduced by weakening the braking force as the bank angle becomes larger.

Patent Document 1: Japanese Unexamined Patent Application, Publication No. 2021-2328

SUMMARY OF THE INVENTION

However, with Patent Document 1, although reducing the falling risk of a motorcycle due to automatic braking is being given consideration, the departure risk of the motorcycle to the shoulder or an oncoming lane due to automatic braking is not given consideration. There is concern over secondary accidents occurring if the vehicle departs from one's own vehicle travel lane. For example, in a curve or before the curve, there is concern over the aforementioned such departure risk rising, even if activating automatic braking in an uprighted state, due to the speed or curvature of a curve at this time.

In addition, the departure risk lowers in the case of a median existing as in a motorway including a freeway. In such a case, it is considered more preferable to lower the collision speed by activating the automatic braking.

The present invention has an object of providing a driving support system for motorcycles which can avoid secondary accidents due to one's own vehicle departing outside of one's own vehicle travel lane, while reducing damage to one's own vehicle due to collision.

A driving support system for motorcycles (for example, the driving support system 1 described later) according to a first aspect of the present invention includes: a road state recognition means (for example, the external sensor unit 2 described later) for recognizing a road state ahead of one's own vehicle; an automatic braking control means (for example, the automatic braking control unit 61 described later) for executing automatic braking to automatically operate a brake device (for example, the brake device 83 described later) according to a level of collision risk between one's own vehicle and an object ahead of one's own vehicle obtained based on a recognition result by the road state recognition means; and a departure risk determination means (for example, the departure risk determination unit 64 described later) for determining a level of a departure risk of one's own vehicle to outside of one's own vehicle travel lane in a case of executing the automatic braking, in which the automatic braking control means interrupts execution of the automatic braking in a case of the departure risk being high.

According to a second aspect of the present invention, in this case, it is preferable for the driving support system to further include: a notification means (for example, the driver notification unit 65, HMI 4 described later) for notifying a driver of information related to the collision risk, and information regarding execution of the automatic braking being interrupted, in a case of execution of the automatic braking being interrupted due to being determined that the departure risk is high by way of the departure risk determination means.

According to a third aspect of the present invention, in this case, it is preferable for the driving support system to further include: a travel environment determination means (for example, the travel environment determination unit 63, external sensor unit 2, vehicle sensor unit 3, navigation device 5 described later) for determining that one's own vehicle is turning or a position of one's own vehicle is before a curve, in which the departure risk determination means determines a level of the departure risk in a case of being determined that one's own vehicle is turning or a case of being determined that the position of one's own vehicle is before a curve.

According to a fourth aspect of the present invention, in this case, it is preferable for the driving support system to further include: an upright inducing means (for example, the upright inducing unit 66, automatic uprighting device 85, HMI 4 described later) for prompting an uprighting operation to the driver to upright one's own vehicle, or automatically performing the uprighting operation, in a case of being determined that the departure risk is low by way of the departure risk determination means, in which the automatic braking control means executes the automatic braking after prompting the driver of the uprighting operation by way of the upright inducing means or automatically performing the uprighting operation by way of the upright inducing means.

According to a fifth aspect of the present invention, in this case, it is preferable for the driving support system to further include: a collision avoidance operation detection means (for example, the driver operation detection unit 67, driving operator 81, brake device 83 described later) for detecting a collision avoidance operation by the driver, after being determined that the collision risk is high, in which the automatic braking control means interrupts execution of the automatic braking, in a case of the collision avoidance operation being detected by way of the collision avoidance operation detection means.

In the driving support system according to the first aspect of the present invention, the automatic braking control means executes automatic braking in response to the level of the collision risk between one's own vehicle and an object ahead of one's own vehicle obtained based on the recognition result of the road state ahead of one's own vehicle. Since it is thereby possible to lower the collision speed in the case of the collision risk between one's own vehicle and an object becoming high, it is possible to reduce damage due to collision of one's own vehicle. In addition, the driving support system includes the departure risk determination means which determines the level of the departure risk of one's own vehicle to outside of one's own vehicle travel lane in the case of executing automatic braking, and the automatic braking control means interrupts execution of automatic braking in the case of the departure risk being high. Since it is thereby possible to interrupt execution of automatic braking in the case of the possibility of one's own vehicle departing to outside of one's own vehicle travel lane being high when executing automatic braking, and yielding to a collision avoidance operation and braking operation by the driver, it is possible to avoid the occurrence of secondary accidents from one's own vehicle departing to outside of one's own vehicle travel lane.

The driving support system according to a second aspect of the present invention includes the notification means which notifies the driver of information related to the collision risk and information about execution of automatic braking being interrupted, in the case of execution of the automatic braking being interrupted due to being determined that the departure risk is high. Since it is thereby possible to let the driver know that the automatic braking is not operating, the driver can perform the optimal collision avoidance operation and braking operation.

In the driving support system according to the third aspect of the present invention, the departure risk determination means determines the level of departure risk, in the case of being determined that one's own vehicle is turning or case of being determined that the position of one's own vehicle is before a curve. In the case of one's own vehicle not turning and the position of one's own vehicle not being before a curve, the possibility of one's own vehicle departing to outside of one's own vehicle travel lane is low even without determining. Consequently, according to the present invention, it is possible to avoid the execution of automatic braking being interrupted due to misjudgment of the departure risk.

In the driving support system according to the fourth aspect of the present invention, the departure risk determination means determines the level of the departure risk in the case of one's own vehicle turning, or case of the position of one's own vehicle being before a curve, the upright inducing means prompts an uprighting operation to upright one's own vehicle to the driver or performs this uprighting operation automatically in the case of being determined that the departure risk is low, and the automatic braking control means executes automatic braking after the uprighting operation is prompted to the driver or the uprighting operation was automatically performed. In the case of the departure risk being low, since it is thereby possible to execute automatic braking upon uprighting one's own vehicle, it is possible to safely execute automatic braking so as not to fall.

In the driving support system according to the fifth aspect of the present invention, the collision avoidance operation detection means detects a collision avoidance operation by the driver after being determined that the collision risk is high, and the automatic braking control means interrupts execution of automatic braking in the case of a collision avoidance operation by the driver being detected. Since it is thereby possible to yield to the optimal collision avoidance operation and braking operation based on the intention of the driver, it is possible to avoid collision or reduce damage from collision.

DETAILED DESCRIPTION OF THE INVENTION

Hereinafter, the configuration of a driving support system for motorcycles according to an embodiment of the present invention will be explained while referencing the drawings.

Figure 1:
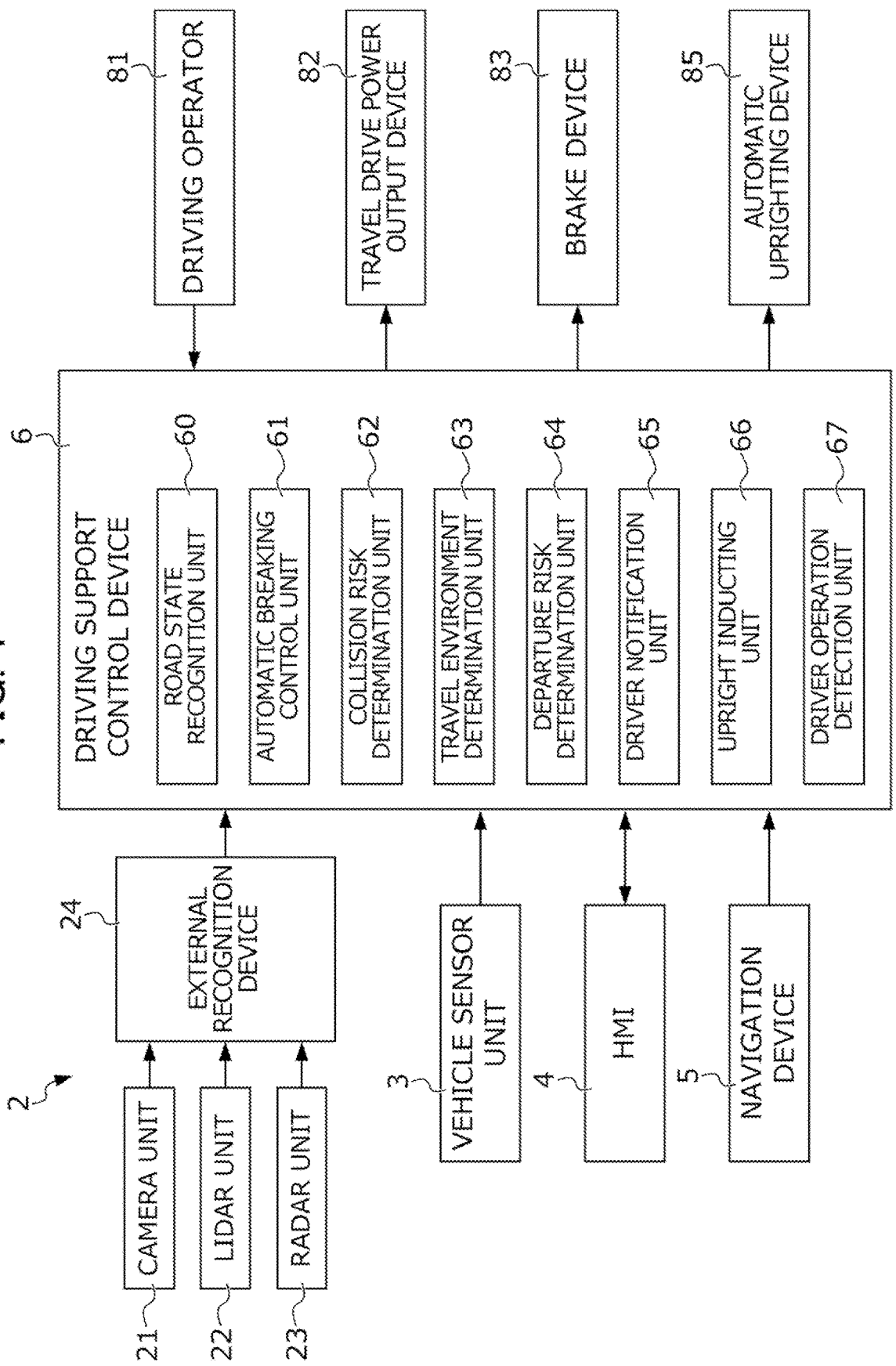
FIG. 1 is a view schematically showing the configuration of a driving support system for motorcycles according to an embodiment of the present invention.

FIG. 1 is a view showing the configuration of a driving support system 1 according to the present embodiment. The driving support system 1 is built into a motorcycle which is not shown. It should be noted that the driving source of this motorcycle may be an internal combustion engine, may be a rotary electrical machine, or may be a combination of these. In addition, the power source of the rotary electrical machine may be a secondary battery, may be a capacitor or may be a fuel cell.

The driving support system 1 supports safe driving of the motorcycle by the driver. Hereinafter, among the various driving support functions realized by this driving support system 1, a collision damage reduction brake function for avoiding collision of one's own vehicle or reducing collision damage by automatically operating a brake device will be explained.

The driving support system 1 includes an external sensor unit 2, vehicle sensor unit 3, man-machine interface (Human Machine Interface) 4 (hereinafter the abbreviation "HMI 4" is used), navigation device 5, driving support control device 6, driving operator 81, travel drive power output device 82, brake device 83 and automatic uprighting device 85. These devices are connected to each other by way of multiple communication lines or serial communication lines such as CAN (Controller Area Network) communication line, by a wireless communication network, or the like.

The external sensor unit 2 is configured by a camera unit 21, LIDAR unit 22, radar unit 23, external recognition device 24, etc.

The camera unit 21, for example, includes a digital camera using a solid-state image sensing device such as CCD (Charge Coupled Devices) and CMOS (Complementary Metal Oxide Semiconductor). The LIDAR unit 22 includes LIDAR (Light Detection and Ranging (LIDAR)) which detects an object, by measuring scattered light from the object relative to laser irradiation generated in pulse form. The radar unit 23 includes millimetric wave radar which detects a target, by measuring the reflected waves from an object relative to the millimetric wave irradiation. It should be noted that this camera unit 21, LIDAR unit 22 and radar unit 23 are installed at any position of the motorcycle in a state facing the front side of one's own vehicle, respectively, e.g., front windshield, mirror, etc.

The external identification device 24 is a computer which recognizes the state of the road existing ahead of one's own vehicle, and the positions, type, speed, etc. of objects (hereinafter these are collectively referred to as "road state"), by performing sensor fusion processing on the detection results from part or all of the camera unit 21, LIDAR unit 22 and radar unit 23. The external identification device 24 sends the identification results thereof to the driving support control device 6, for example.

The vehicle sensor unit 3 includes a vehicle speed sensor which detects the speed of the vehicle, and a 5-axis or 6 axis inertia measuring device. The inertia measuring device detects the angle or angular speed and acceleration of 3 axes (roll axis, pitch axis and yaw axis) of the body of the vehicle. The detection signal of the vehicle sensor unit 3 is sent to the driving support control device 6, for example.

The HMI 4 presents various information to the occupant of the vehicle, and accepts input operations by the occupant. The HMI 4 includes various display devices, speakers, buzzer, touch panel, switches, keys, etc.

The navigation device 5, for example, includes a GNSS receiver which specifies the current position of the vehicle based on signals received from GNSS (Global Navigation Satellite System) satellites, a storage device which stores map information, etc. The navigation device 5 sends information related to the current position of the vehicle to the driving support control device 6 together with map information of the current position.

The driving operator 81 includes the accelerator grip and brake pedal which the driver operates during acceleration and deceleration, the clutch lever and shift pedal which the driver operates while shifting, the steering handle which the driver operates while turning, a plurality of operator sensors which detect the operation amount and existence of operation of these, etc. The detection signals of these operator sensors are sent to the driving support control device 6.

The travel drive power output device 82 outputs travel drive power for the vehicle to travel to the drive wheel. The travel drive power output device 82 includes a driving power source such as an internal combustion engine or rotary electrical machine, the transmission, and an electronic control unit which, based on command signals sent from driving support control device 6, controls this driving power source and transmission, and causes acceleration/deceleration according to the command to be generated.

The brake device 83 includes, for example, a brake caliper, cylinder which transmits hydraulic pressure to this brake caliper, an electric motor which generates hydraulic pressure in the cylinder, and an electronic control unit which controls the electric motor based on a command signal sent from the driving support control device 6 to cause braking force according to the command to be generated.

The automatic uprighting device 85 automatically performs an uprighting operation for operating one's own vehicle, based on a command signal sent from the driving support control device 6. As this automatic uprighting device 85, for example, an automatic steering device which automatically operates the steering device of one's own vehicle, the mechanism disclosed in Japanese Patent No. 6081238 by the present applicants, or the like can be used.

The driving support control device 6 is a computer which handles control related to the driving support functions. The driving support control device 6 includes, as modules realizing the collision damage reduction brake function, which is one of the plurality of driving support functions, an automatic braking control unit 61, a collision risk determination unit 62, a travel environment determination unit 63, a departure risk determination unit 64, a driver notification unit 65, an upright inducing unit 66 and driver operation detection unit 67.

The automatic braking control unit 61 executes or Interrupts automatic braking for automatically operating the brake device 83, based on the determination results of the collision risk determination unit 62, travel environment determination unit 63 and departure risk determination unit 64, as well as detection results of the driver operation detection unit 67. In addition, the automatic braking control unit 61, in the case of not being able to decrease the collision speed sufficiently by only braking operation of the brake device 83 by the driver, executes assist braking to increase the braking force by the brake device 83, by supplementally operating the brake device 83.

The collision risk determination unit 62 determines the level of the collision risk between one's own vehicle and an object ahead of one's own vehicle, based on the recognition results of the road state ahead of one's own vehicle by the external recognition device 24. It should be noted that, in addition to the recognition result of the road state, the detection results of the vehicle sensor unit 3 may be combined in the determination of the collision risk of the collision risk determination unit 62. The determination result by the collision risk determination unit 62 is sent to the automatic braking control unit 61, driver notification unit 65 and driver operation detection unit 67.

The travel environment determination unit 63 determines whether or not one's own vehicle is turning, or whether or not the position of one's own vehicle is before a curve. The travel environment determination unit 63 determines whether or not one's own vehicle is turning, or whether or not the position of one's own vehicle is before a curve, based on all, any or a combination of the recognition result of the road state ahead of one's own vehicle by the external recognition device 24, the detection results of the vehicle sensor unit 3, and the positional information of one's own vehicle and map information sent from the navigation device 5. The determination result by the travel environment determination unit 63 is sent to the automatic braking control unit 61 and/or departure risk determination unit 64.

The departure risk determination unit 64 determines the level of the departure risk to outside of one's own vehicle travel lane of one's own vehicle in the case of executing the automatic braking by the automatic braking control unit 61. Herein, outside one's own vehicle travel lane also includes the travel lane adjacent to one's own vehicle travel lane, in addition to the oncoming lane and sidewalk. The departure risk determination unit 64 preferably determines the risk and fall of the departure risk to outside of one's own vehicle travel lane, by considering the existence of an object delineating the inside/outside of one's own vehicle travel lane, such as a median and guard rail, based on all, any or a combination of the recognition result of the road state, detection results of the vehicle sensor unit 3 and positional information of one's own vehicle and map information sent from the navigation device 5. In other words, in the case of an object delineating the inside/outside of one's own vehicle travel lane existing, the departure risk becomes lower, and in the case of such an object not existing, the departure risk becomes higher. In addition, such a departure risk rises in the case of one's own vehicle turning, or a case of the position of one's own vehicle being before a curve; therefore, the departure risk 64 preferably determines the level of the departure risk to outside of one's own vehicle travel lane of one's own vehicle, in the case of being determined that one's own vehicle is turning, or the case of being determined that the position of one's own vehicle is before a curve by the travel environment determination unit 63. The determination result from the departure risk determination unit 64 is sent to the automatic braking control unit 61 and/or driver notification unit 65.

The driver notification unit 65 notifies various information to the driver via the HMI 4 while traveling. More specifically, the driver notification unit 65, in the case of being determined that the collision risk is high by the collision risk determination unit 62, executes front collision warning, or notifies information related to the propriety of executing automatic braking, using the HMI 4.

The upright inducing unit 66 prompts the uprighting operation to the driver, or automatically performs this uprighting operation, in the case of being determined that the departure risk is low by the departure risk determination unit 64, and being before the automatic braking control unit 61 executes automatic braking. More specifically, the upright inducing unit 66 prompts the uprighting operation to the driver, by display a message or illuminating a warning light for prompting the uprighting operation via the HMI 4, for example. In addition, the upright inducing unit 66 can perform the uprighting operation automatically by this automatic uprighting device 85, by sending a command signal to the automatic uprighting device 85.

The driver operation detection unit 67 detects a collision avoidance operation and/or uprighting operation by the driver, after being determined that the collision risk is high by the collision risk determination unit 62. Herein, collision avoidance operation includes a steering operation by the driver for avoiding collision with an object for which collision is feared, a braking operation for decreasing the collision speed relative to this object, etc. The driving operation detection unit 67 detects a collision avoidance operation by the driver, based on a detection signal of an operator sensor sent from the driving operator 81, for example. The detection result by this driver operation detection unit 67 is sent to the automatic braking control unit 61.

Figure 2A:
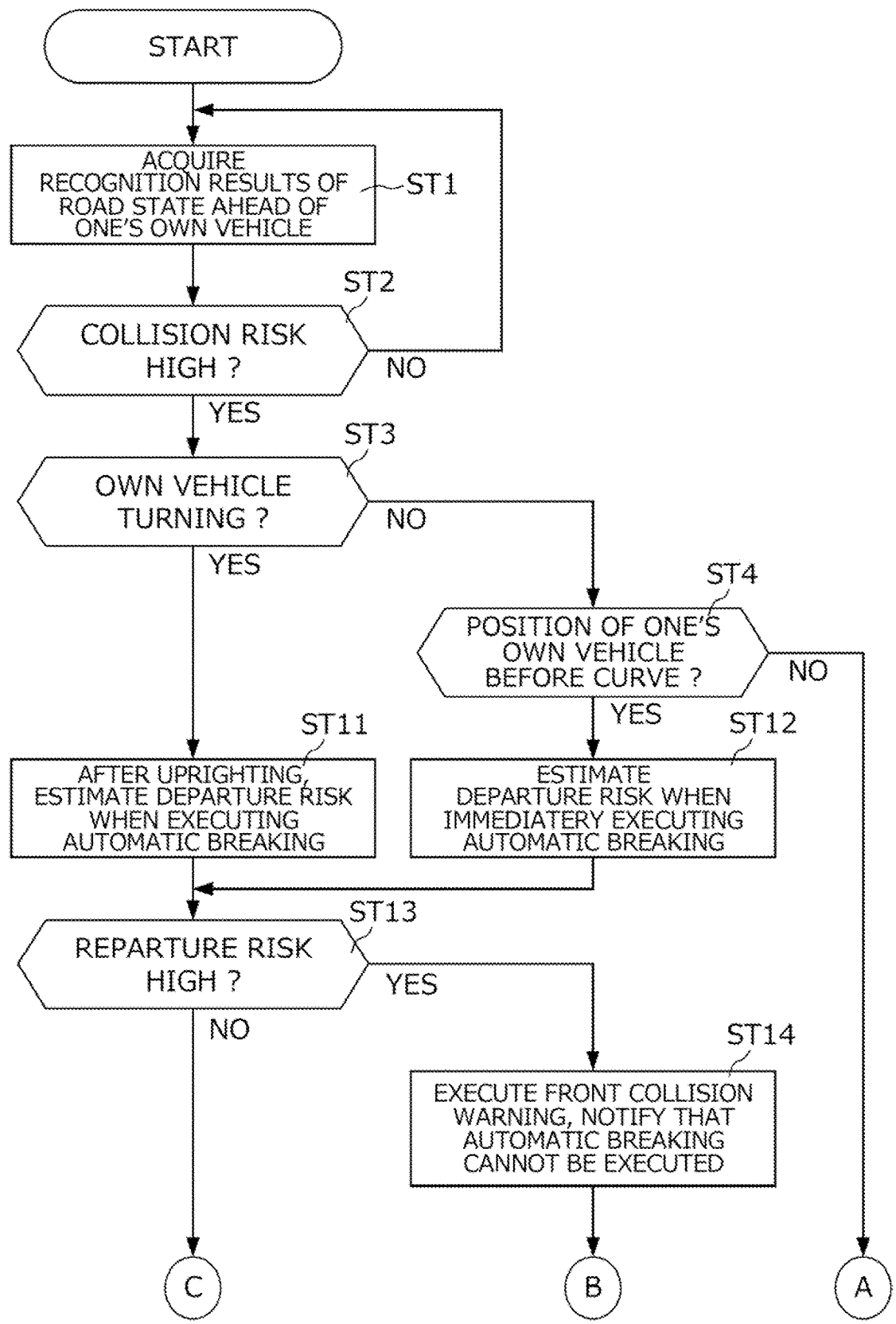
FIG. 2A is a flowchart showing a specific sequence of collision damage reduction brake control processing by a driving support control device (1 of 2)
Figure 2B:
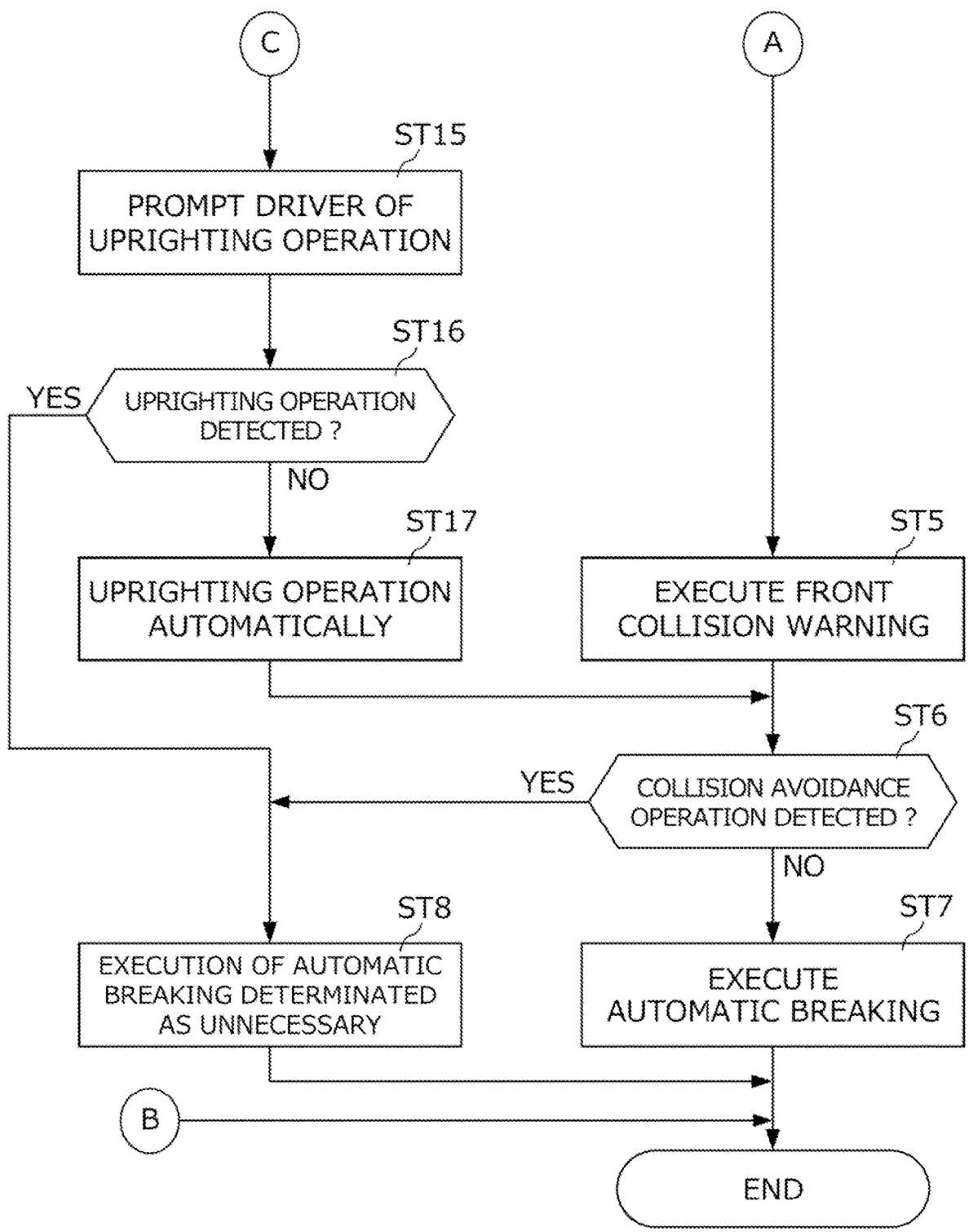
FIG. 2B is a flowchart showing a specific sequence of collision damage reduction brake control processing by the driving support control device (2 of 2).

FIGS. 2A and 2B are flowcharts showing specific sequences of collision damage reduction brake control processing by the driving support control device 6. Each step shown in FIGS. 2A and 2B is realised by executing, by way of the driving support control device 6, a computer program stored in a storage device (not shown) during travel of the motorcycle.

In Step ST1, the driving support control device 6 acquires the recognition result of the road state ahead of one's own vehicle by the external recognition device 24, and then advances to Step ST2. In Step ST2, the collision risk determination unit 62 determines whether the collision risk between one's own vehicle and an object ahead of one's own vehicle is high, based on the recognition result of the road state, etc. acquired in Step ST1. The collision risk determination unit 62, in the case of the determination result in Step ST2 being YES, i.e. case of determining that the collision risk is high, advances to the processing of Step ST3, and in the case of the determination result in Step ST2 being NO, i.e. case of determining that the collision result is low, returns to the processing of Step ST1.

In Step ST3, the travel environment determination unit 63 determines whether or not one's own vehicle is turning. The travel environment determination unit 63, in the case of the determination result in Step ST3 being YES, advances to the processing of Step ST11, and in the case of the determination result in Step ST3 being NO, advances to the processing of Step ST4. In Step ST4, the travel environment determination unit 63 determines whether or not the position of one's own vehicle is before a curve. The travel environment determination unit 63, in the case of the determination result in Step ST4 being YES, advances to the processing of Step ST12, and in the case of the determination result in Step ST4 being NO, advances to the processing of Step ST5.

In Step ST5, the driver notification unit 65 executes the front collision warning using the HMI 4, and notifies the driver that an object having a risk of colliding with one's own vehicle exists ahead of one's own vehicle, and then advances to Step ST6.

In Step ST6, the automatic braking control unit 61 determines whether or not a collision avoidance operation by the driver was detected by the driver operation detection unit 67. The automatic braking control unit 61, in the case of the determination result in Step ST6 being NO, advances to Step ST7. In Step ST7, the automatic braking control unit 61 executes automatic braking, and then ends the processing shown in FIGS. 2A and 2B. In the above way, the driving support control device 6 executes automatic braking, in the case of being determined that the collision risk is high, one's own vehicle is not turning, the position of one's own vehicle is not before a curve, and a collision avoidance operation by the driver has not been detected.

On the other hand, in the case of the determination result in Step ST6 being YES, i.e. case of a collision avoidance operation by the driver being detected, the automatic braking control unit 61 determines it as unnecessary to execute automatic braking (refer to Step ST8), and ends the processing shown in FIGS. 2A and 2B. In other words, the driving support control device 6, after being determined that the collision risk is high, interrupts the execution of automatic braking, in the case of a collision avoidance operation by the driver being detected. It should be noted that, in this case, the automatic braking control unit 61 may interrupt execution of automatic braking, and execute assist braking to assist the braking operation by the driver as necessary.

On the other hand, in the case of the determination result in Step ST3 being YES, i.e. case of being determined that one's own vehicle is turning by way of the travel environment determination unit 63, the departure risk determination unit 64 estimates the departure risk of one's own vehicle to outside of one's own vehicle travel lane by calculating the traveling direction and/or traveling distance of one's own vehicle, in the case of executing automatic braking after uprighting the body which is a turning posture (refer to Step ST11).

In addition, in the case of the determination result in Step ST4 being YES, i.e. case of being determined that the position of one's own vehicle is before a curve by way of the travel environment determination unit 63, the departure risk determination unit 64 estimates the departure risk of one's own vehicle to outside of one's own vehicle travel lane, by calculating the traveling direction and/or traveling distance of one's own vehicle in the case of immediately executing automatic braking (refer to Step ST12). It should be noted that, in the estimation of the departure risk in these Steps ST11 and ST12, the departure risk determination unit 64 preferably considers the existence of an object preventing departure of one's own vehicle, such as a median or guard rail on the front side in the traveling direction of one's own vehicle in the case of executing automatic braking.

In Step ST13, the departure risk determination unit 64 determines whether or not the departure risk of one's own vehicle to outside of one's own vehicle travel lane in the case of executing automatic braking is high, based on the estimation result in Step ST11 or Step ST12. The departure risk determination unit 64, in the case of the determination result in Step ST13 being YES, i.e. case of the possibility of one's own vehicle departing to outside of one's own vehicle travel lane being high if executing automatic braking, advances to Step ST14 to prevent execution of automatic braking.

In Step ST14, the driver notification unit 65 executes front collision warning using the HMI 4, notifies the driver that an object for which there is concern of colliding with one's own vehicle exists ahead of one's own vehicle, and notifies the driver of information regarding it is not possible to execute automatic braking by using the HMI 4, and then ends the processing shown in FIGS. 2A and 2B. In the above way, the driving support control device 6 interrupts execution of automatic braking, in the case of being determined that the collision risk is high, one's own vehicle is turning or the position of one's own vehicle is before a curve, and further it is determined that the departure risk becomes high when executing automatic braking. In addition, in this case, the driver notification unit 65, in the case of execution of automatic braking being interrupted due to being determined that the departure risk is high in this way, executes front collision warning, and notifies the driver via the HMI 4 of information regarding the execution of automatic braking being interrupted.

On the other hand, in the case of the determination result in Step ST13 being NO, i.e. case of being determined that the departure risk being low by the departure risk determination unit 64, the departure risk determination unit 64 advances to the processing of Step ST15. In Step ST15, the upright inducing unit 66 displays a message about prompting an uprighting operation to the driver via the HMI 4, so as to make possible to execute automatic braking in a state in which one's own vehicle is upright.

In Step ST16, the automatic braking control unit 61 determines whether or not an uprighting operation by the driver has been detected by the driver operation detection unit 67. The automatic braking control unit 61, in the case of the determination result in Step ST16 being YES, i.e. case of an uprighting operation by the driver being detected, determines it as unnecessary to execute automatic braking (refer to Step ST8), and then ends the processing shown in FIGS. 2A and 2B. In the above way, the driving support control device 6 interrupts execution of automatic braking in the case of being determined that the collision risk is high, one's own vehicle turning or the position of one's own vehicle being before a curve, being determined that the departure risk is low, and an uprighting operation by the driver being detected. It should be noted that, in this case, the automatic braking control unit 61 may interrupt execution of automatic braking, and execute assist braking which supplements braking operation by the driver as necessary.

On the other hand, the automatic braking control unit 61, in the case of the determination result in Step ST16 being NO, advances to the processing of Step ST17. In Step ST17, the upright inducing unit 66 advances to the processing of Step ST6, after performing an uprighting operation automatically by way of the automatic uprighting device 85. In the above way, the driving support control device 6, in the case of being determined that the collision risk is high, one's own vehicle turning or the position of one's own vehicle being before a curve, and being determined that the departure risk is low, prompts an uprighting operation to the driver, or automatically performs this uprighting operation, and then executes automatic braking.

The following effects are exerted by the driving support system 1 for motorcycles according to the present embodiment.

(1) In the driving support system 1, the driving support control device 6 determines the level of a collision risk between one's own vehicle and an object ahead of one's own vehicle based on the recognition result of the road state ahead of one's own vehicle, and executes automatic braking in response to the determination result of this collision risk. Since it is thereby possible to lower the collision speed in the case of the collision risk between one's own vehicle and an object becoming high, it is possible to reduce damage due to collision of one's own vehicle. In addition, the driving support system 1 includes the departure risk determination unit 64 which determines the level of the departure risk of one's own vehicle to outside of one's own vehicle travel lane in the case of executing automatic braking, and the automatic braking control unit 61 interrupts execution of automatic braking in the case of being determined that the departure risk is high. Since it is thereby possible to interrupt execution of automatic braking in the case of the possibility of one's own vehicle departing to outside of one's own vehicle travel lane being high when executing automatic braking, and yielding to a collision avoidance operation and braking operation by the driver, it is possible to avoid the occurrence of secondary accidents from one's own vehicle departing to outside of one's own vehicle travel lane.

(2) The driving support system 1 includes the driver notification unit 65 which executes front collision warning in the case of execution of automatic braking being interrupted due to being determined that the departure risk is high, and notifies the driver via the HMI 4 of information regarding execution of the automatic braking being interrupted. Since it is thereby possible to let the driver know that the automatic braking is not operating, the driver can perform the optimal collision avoidance operation and braking operation.

(3) In the driving support system 1, the departure risk determination unit 64 determines the level of departure risk, in the case of being determined that one's own vehicle is turning or case of being determined that the position of one's own vehicle is before a curve. In the case of one's own vehicle not turning and the position of one's own vehicle not being before a curve, the possibility of one's own vehicle departing to outside of one's own vehicle travel lane is low even without determining. Consequently, according to the driving support system 1, it is possible to avoid the execution of automatic braking being interrupted due to misjudgment of the departure risk.

(4) With the driving support system 1, the departure risk determination unit 64 determines the level of the departure risk in the case of one's own vehicle turning, or case of the position of one's own vehicle being before a curve, the upright inducing unit 66 prompts an uprighting operation to upright one's own vehicle to the driver or performs this uprighting operation automatically in the case of being determined that the departure risk is low, and the automatic braking control unit 61 executes automatic braking after the uprighting operation is prompted to the driver or the uprighting operation was automatically performed. In the case of the departure risk being low, since it is thereby possible to execute automatic braking upon uprighting one's own vehicle, it is possible to safely execute automatic braking so as not to fall.

(5) In the driving support system 1, the driver operation detection unit 67 detects a collision avoidance operation by the driver after being determined that the collision risk is high, and the automatic braking control unit 61 interrupts execution of automatic braking in the case of a collision avoidance operation by the driver being detected. Since it is thereby possible to yield to the optimal collision avoidance operation and braking operation based on the intention of the driver, it is possible to avoid collision or reduce damage from collision.

Although an embodiment of the present invention has been explained above, the present invention is not to be limited thereto. The configurations of detailed parts may be modified as appropriate within the scope of the gist of the present invention.

What is claimed is:

1. A driving support system for motorcycles, comprising:
    a road state recognition means for recognizing a road state ahead of one's own vehicle;
    an automatic braking control means for executing automatic braking to automatically operate a brake device according to a level of collision risk between one's own vehicle and an object ahead of one's own vehicle obtained based on a recognition result by the road state recognition means; and
    a departure risk determination means for determining a level of a departure risk of one's own vehicle to outside of one's own vehicle travel lane in a case of executing the automatic braking,
    wherein the automatic braking control means interrupts execution of the automatic braking in a case of the departure risk being high.

2. The driving support system for motorcycles according to claim 1, further comprising a notification means for notifying a driver of information related to the collision risk, and information regarding execution of the automatic braking being interrupted, in a case of execution of the automatic braking being interrupted due to being determined that the departure risk is high by way of the departure risk determination means.

3. The driving support system for motorcycles according to claim 2, further comprising a travel environment determination means for determining that one's own vehicle is turning or a position of one's own vehicle is before a curve,
    wherein the departure risk determination means determines a level of the departure risk in a case of being determined that one's own vehicle is turning or a case of being determined that the position of one's own vehicle is before a curve.

4. The driving support system for motorcycles according to claim 3, further comprising an upright inducing means for prompting an uprighting operation to the driver to upright one's own vehicle, or automatically performing the uprighting operation, in a case of being determined that the departure risk is low by way of the departure risk determination means,
    wherein the automatic braking control means executes the automatic braking after prompting the driver of the uprighting operation by way of the upright inducing means or automatically performing the uprighting operation by way of the upright inducing means.

5. The driving support system for motorcycles according to claim 4, further comprising a collision avoidance operation detection means for detecting a collision avoidance operation by the driver, after being determined that the collision risk is high,
    wherein the automatic braking control means interrupts execution of the automatic braking, in a case of the collision avoidance operation being detected by way of the collision avoidance operation detection means.

6. The driving support system for motorcycles according to claim 1, further comprising a travel environment determination means for determining that one's own vehicle is turning or a position of one's own vehicle is before a curve,
    wherein the departure risk determination means determines a level of the departure risk in a case of being determined that one's own vehicle is turning or a case of being determined that the position of one's own vehicle is before a curve.

7. The driving support system for motorcycles according to claim 6, further comprising an upright inducing means for prompting an uprighting operation to the driver to upright one's own vehicle, or automatically performing the uprighting operation, in a case of being determined that the departure risk is low by way of the departure risk determination means,
    wherein the automatic braking control means executes the automatic braking after prompting the driver of the uprighting operation by way of the upright inducing means or automatically performing the uprighting operation by way of the upright inducing means.

8. The driving support system for motorcycles according to claim 7, further comprising a collision avoidance operation detection means for detecting a collision avoidance operation by the driver, after being determined that the collision risk is high,
    wherein the automatic braking control means interrupts execution of the automatic braking, in a case of the collision avoidance operation being detected by way of the collision avoidance operation detection means.

* * * * *